(No Model.)

A. C. ESTABROOK.
MACHINE FOR MILLING BONE BLANKS FOR TOOTH BRUSHES.

No. 279,728. Patented June 19, 1883.

Attest:
Philip F. Larner
Lowell Bartle

Inventor:
Alanson C. Estabrook
By
Attorney

UNITED STATES PATENT OFFICE.

ALANSON C. ESTABROOK, OF FLORENCE, MASSACHUSETTS, ASSIGNOR TO THE FLORENCE MANUFACTURING COMPANY, OF SAME PLACE.

MACHINE FOR MILLING BONE BLANKS FOR TOOTH-BRUSHES.

SPECIFICATION forming part of Letters Patent No. 279,728, dated June 19, 1883.

Application filed December 12, 1882. (No model.)

*To all whom it may concern:*

Be it known that I, ALANSON C. ESTABROOK, of Florence, in the town of Northampton, county of Hampshire, and State of Massachusetts, have invented certain new and useful Improvements in Machines for Milling Bone Blanks for Tooth-Brushes; and I do hereby declare that the following specification, taken in connection with the drawings furnished and forming a part of the same, is a clear, true, and complete description of the several features of my invention.

In certain prior Letters Patent of the United States, issued to me July 4, 1882, I show and describe a bone-milling machine for the purpose indicated, and said machine embodies milling-heads which are moved laterally toward and from a clamp in which the section of bone to be milled is mounted. In accordance with my present invention the bone is mounted in a clamp which is moved longitudinally and also laterally toward and from a milling-head, so as to be successively operated upon by the opposite sides of one head, or by one side only thereof, or by the coincident sides of two milling-heads, and although when two heads are employed, as in the best embodiment of my invention, neither of them has any movement other than the requisite rotary cutting movement, it is to be understood that one milling-head mounted on a spindle having movable boxes may be employed in connection with another head limited to a rotary movement without departure from certain features of my present invention. In connection with my present improvements, there may be employed certain of the features secured to me under said prior Letters Patent.

After a full description of machines embodying my present invention and certain variations in the particular construction and arrangement of their several parts, the features deemed novel will be specified in the several claims hereunto annexed.

Figure 1:
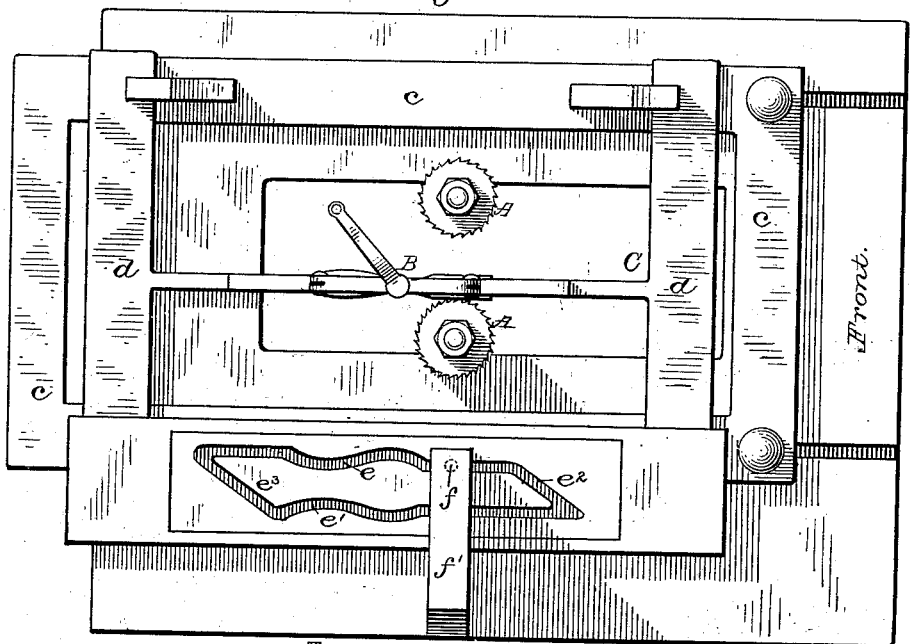
Figure 2:
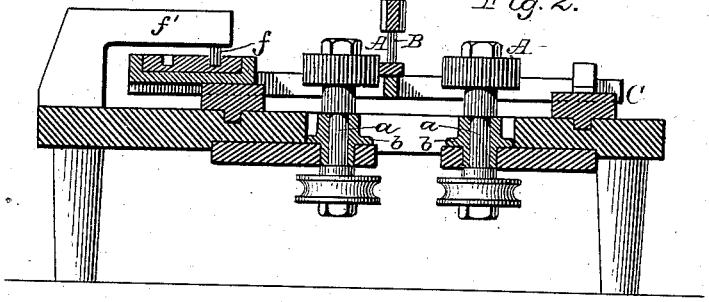
Figure 3:
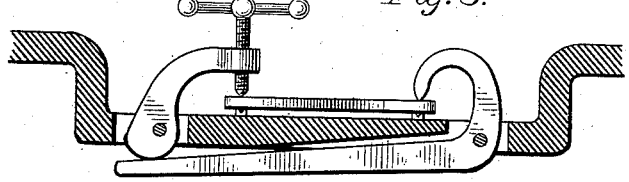
Figure 4:
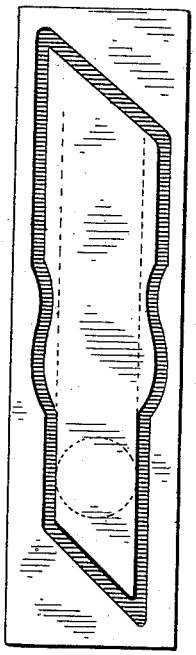
Figure 5:
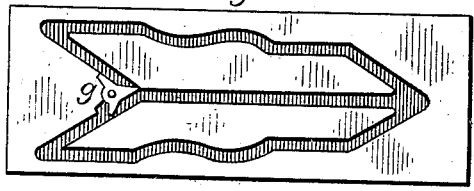

Referring to the drawings, Figure 1 is a top or plan view of a machine embodying my improvements. Fig. 2 is a vertical section of the machine on line $x$, Fig. 1. Fig. 3 is a side view of a clamp which may be used in lieu of that shown in Figs. 1 and 2. Fig. 4 illustrates connected slotted forms for causing the clamp to present the bone to the opposite sides of a milling-head. Fig. 5 illustrates forms for causing the clamp to co-operate with two heads during its forward movement.

It is to be understood that the milling-heads A are to be of such size and of such material as will best adapt them for working bone into tooth-brush blanks, as indicated in my before-mentioned prior patent. In its best form my present machine has two of such heads mounted upon spindles $a$, which revolve in fixed boxes $b$, and at such distance apart that they cannot simultaneously operate upon opposite edges or sides of a bone section, so that the bone when longitudinally moved in one direction will be presented to one head and then presented to the other head during the return movement of the clamp and bone, instead of having the bone presented to both heads simultaneously, as in my prior machine, although this latter operation may be provided for without departure from certain features of my present invention, as will be hereinafter indicated.

The bone-clamp B, as shown in Figs. 1 and 2, is substantially like that shown in my prior patent; but the clamp-carriage now shown differs in certain important particulars from that shown in said patent. The present clamp-carriage C is composed of two sections, $c$ and $d$. The bed-section $c$ is limited to a longitudinal sliding movement upon the top of the frame of the machine, it being mounted in suitable longitudinal guides. The section $d$ is carried upon section $c$, so that it has a longitudinal movement with said section; but it is mounted in transverse guides, rendering it also capable of a transverse movement in a line at right angles to the movement of the lower or bed section, $c$. The clamp B, being rigidly mounted upon the upper section, $d$, is capable of being moved simultaneously longitudinally and laterally, and is therefore capable of being moved in curved lines, straight lines, or diagonally.

In order that the desired contour of the edges or the sides of tooth-brush blanks may be obtained, predetermined forms are employed, as described in my prior patent. As shown in Figs. 1 and 2, two slotted forms, $e\ e'$, are employed in connection with the two milling-heads there shown. The form $e$ causes the bone-clamp to occupy a working position with relation to the left-hand milling-head, (as viewed from the front of the machine,) and the form $e'$ provides for its presenting the bone to the right-hand head. These forms are usually slotted metallic plates, which can readily be applied to or detached from the section $d$ at one side thereof, and a stud, $f$, depending from a stationary arm or bracket, $f'$, occupies the slot of a form, so that during the longitudinal movement of the carriage the section $d$ is properly moved laterally for developing a contour of the bone by the head, similar to the lines or curves of the form. As shown, the two slotted forms are connected at each end by diagonal slots $e^2$ $e^3$, so that the clamp, having been moved forward in proper relation to the left-hand head, will then be moved laterally away therefrom by the slot $e^2$, leaving the stud $f$ free to occupy form $e'$ for causing the clamp on its return movement to properly present the bone to the right-hand head. When the carriage has been drawn rearward until the clamp has passed the heads, the slot $e^3$ causes the stud $f$ to again occupy form $e$, thus placing the clamp in position to present another piece of bone to the left-hand head, and so on, as before described. When thus organized, the machine requires a forward and backward movement of the clamp for milling the two sides or the two edges of a bone blank, the heads operating successively instead of simultaneously during the forward movement of the clamp, as in my prior machine. The two milling-heads in this machine, as shown, revolve in the same direction; but their coincident milling-faces move in opposite directions, so as to properly engage with the bone during the forward and the return movement of the clamp. It is obvious that either one of these milling-heads may be mounted on a spindle provided with movable boxes, and be controlled by suitable forms attached to the longitudinally-sliding bed-section $c$, as in my prior patent, and thereby provide for the simultaneous operation of both heads, in which case they would be revolved in opposite directions and but one form be employed in connection with the upper carriage-section, $d$, the contour of the form for controlling the movable box-head being such as to provide for lateral movement of the said head corresponding with the lateral movements of the clamp, and to also provide for such independent lateral movement of said head as will cause it to mill the desired contour on the bone.

It is also obvious that a single milling-head may be used with the clamp-carriage shown, in which case right and left hand machines will be requisite, involving the working of one portion of a blank in each machine; or a single head may be used with the clamp-carriage shown, if forms be used therewith which will cause the head to mill one side or edge of the blank while moving forward on one side of the head, and to mill the opposite side or edge of the blank while moving backward on the opposite side of the head, in which case the bar of the carriage on which the clamp is mounted is elevated at each end of the clamp, so that in passing from one side of the head to the other said bar can pass freely over the head, the slotted forms being connected by slots at each end, substantially as when two heads are used.

The clamp shown in Fig. 3 may be used, as described, for presenting the bone to opposite sides of a single head, the forms, Fig. 4, used therewith being separated by a space substantially corresponding with the diameter of the head, and of such length and contour as will secure the proper cut upon the bone and enable the clamp to be carried sufficiently past the head in either direction to pass from left to right or from right to left, as the case might be.

With the sectional clamp-carriage described two milling-heads with fixed boxes may be employed, which revolve in opposite directions and with the coincident milling-faces moving in the same direction, and when so organized each head would operate upon the bone during a forward movement of the clamp, the latter therefore requiring an intermediate return movement. In this case the forms are connected as shown in Fig. 5, and have an intermediate straight slot for guiding the return movement of the clamp, and at one end of said slot there is an automatic switch, $g$, which causes the stud to alternately traverse the two angular slots which respectively communicate with the adjacent ends of the forms.

Each of the organizations described involves the novel combination, with one or more bone-milling heads mounted on spindles and in stationary boxes, of a clamp, a sectional clamp-carriage, and one or more forms, which cause the clamp to be moved laterally toward and from the milling-faces during the longitudinal movement of the clamp-carriage, and it is obvious that still other variations may be made with more or less desirable results without departure from the main feature of my invention. I have shown two forms of clamp which engage with the bone by pressure upon its upper surface and at two points thereon; but other forms of clamp may be successfully employed, if arranged to engage with the ends of the bone—as, for instance, as illustrated in my Letters Patent of July 4, 1882, No. 260,375.

I am of course aware that various machines have heretofore been organized for jointing barrel-staves, cutting irregular moldings, carving and routing, in which clamps, clamp-carriages, forms, and cutter-heads have been variously employed, and it is therefore to be understood that I make no claim to such elements in combination other than as specifically set forth in my claims, and also only when they are so constructed and combined as to render them practically serviceable for performing the operation of milling bone blanks for tooth-brushes.

Having thus described my invention, I claim as new and desire to secure by Letters Patent—

1. The combination, substantially as hereinbefore described, of a bone-milling head limited to a rotary movement, a clamp constructed to confine a tooth-brush blank, a sectional clamp-carriage, a form, and a stud which occupies said form and guides and causes said clamp to be moved laterally during the longitudinal movement of the clamp-carriage, as set forth.

2. In a bone-milling machine, the combination, with a clamp constructed to firmly hold a tooth-brush blank, and a sectional clamp-carriage, of a pair of slotted forms connected by slots, and a stud occupying said slots for causing the clamp to be moved laterally during the longitudinal movement of the carriage, substantially as described, whereby the opposite sides of a tooth-brush blank may be alternately presented for milling.

3. The combination, substantially as hereinbefore described, of a pair of rotary bone-milling heads mounted on spindles in stationary boxes, a clamp, a sectional clamp-carriage, and a pair of connected forms and a stud which guide the clamp laterally during the longitudinal movement of the carriage and cause it to be alternately presented alongside of the two milling-heads, as set forth.

ALANSON C. ESTABROOK.

Witnesses:
D. W. GOODELL,
F. S. CROSSMAN.